United States Patent [19]

Falzarano et al.

[11] Patent Number: 5,016,776
[45] Date of Patent: May 21, 1991

[54] NUCLEAR FUEL CONTAINER TAMPER-PROOF CLOSURE

[75] Inventors: Michael J. Falzarano, Simsbury; Adrian P. Wivagg, Tolland, both of Conn.

[73] Assignee: Combustion Engineering, Inc., Windsor, Conn.

[21] Appl. No.: 365,270

[22] Filed: Jun. 12, 1989

[51] Int. Cl.⁵ ............................................. B65D 51/12
[52] U.S. Cl. ............................... 220/305; 220/306; 220/284; 215/302; 376/272; 250/506.1; 252/633
[58] Field of Search ............... 220/305, 284, 285, 286, 220/306; 215/302, 303; 376/272; 250/506.1, 507.1; 252/633

[56] References Cited

U.S. PATENT DOCUMENTS

| | | | |
|---|---|---|---|
| 871,697 | 11/1907 | Hofheimer | 215/302 |
| 3,937,347 | 2/1976 | Cottingham | 215/213 |
| 4,098,417 | 7/1978 | Bennett | 215/204 |
| 4,172,532 | 10/1979 | Palsson | 215/215 |
| 4,326,918 | 4/1982 | Lapides | 376/272 |
| 4,436,693 | 3/1984 | Zezza et al. | 376/272 |
| 4,437,578 | 3/1984 | Bienek et al. | 220/256 |
| 4,619,808 | 10/1986 | Formanek | 376/272 |
| 4,625,122 | 11/1986 | Botzem et al. | 250/506.1 |
| 4,754,894 | 7/1988 | Simon et al. | 220/256 |
| 4,883,637 | 11/1989 | McDaniels, Jr. | 376/272 |

*Primary Examiner*—Stephen Marcus
*Assistant Examiner*—Stephen Cronin
*Attorney, Agent, or Firm*—John H. Mulholland

[57] ABSTRACT

A tamper-proof closure 10 is inserted by means of positioning tool 20 into a nuclear fuel consolidation storage canister 30. The closure 10 includes a grooved weakened portion 44, which if it exceeds its elastic limit when the base 12 is flexed during removal attempts will indicate any attempts to remove or otherwise tamper with the thus closed canister. Locking tabs 18, on transverse legs 13 and 14 extending from base 12 are engaged in slots 40 in the wall of the opening of canister 30 when the closure 10 is in fuel storage position. Tool 20 has a portion 46 which enters a slot 48 in base 12 at 90° to its working position and then twists to engage spanning portion 42's flanges 43 in slots of flanges 16 on the legs 13 and 14 to retract tabs 18. The base is prevented from flexing on insertion into the container opening by support it receives from portion 46.

11 Claims, 1 Drawing Sheet

NUCLEAR FUEL CONTAINER TAMPER-PROOF CLOSURE

BACKGROUND OF THE INVENTION

The invention relates to covers or closures for containers such as nuclear fuel storage canisters of the type used to store consolidations of spent fuel rods underwater. An understanding of fuel consolidation may be gained from U.S. Pat. No. 4,619,808 issued to Formanek, Oct. 28, 1986 and assigned to Combustion Engineering, Inc., assignee of the instant application.

It is important to know that stored spent nuclear fuel rods are in closed canisters which are fully identified as to content and time in residence in a spent fuel pool. To ensure the accuracy of records, indicia are stamped on the canister closure. It is also important to know that the closure has not been tampered with or that access to the contents has not been had to ensure such accuracy. Moreover, it is also important that the closure be inexpensive and capable of providing natural convection flow of the spent fuel pool liquid (water) therethrough. As a practical matter, it is also important that the closure not obstruct canister lift features for remote handling of the canister in the pool and that the tamper-proof closure can be easily positioned in place in the opening of the canister and removed when desired.

Nuclear fuel consolidation canisters are normally provided with a combination lifting and storage cover. These prior art covers are complicated and expensive and one is required for each canister. In using the instant invention, reusable separate lifting covers are employed in handling, but a new and expensive separate lifting cover for each canister is not required, since for storage, only the disposable sheet steel tamper-proof cover of the invention is needed.

SUMMARY OF THE INVENTION

The invention is a tamper-proof cover or closure for a nuclear fuel rod consolidation canister. The canister is a container for storage of spent fuel with an opening of a given plane geometric figure, preferably a square, having opposite sides.

The novel closure has a base, the extremities of which lie along the perimeter of a similar geometric figure, usually a square, slightly smaller than the opening defining figure. Closure walls are preferably integral with and are transversely connected to the base along the opposite sides of the square. The walls extend outwardly along the opposite sides of the square container opening when the closure is in place in the opening. On the ends of the closures walls are integral slotted flanges which extend inwardly substantially parallel to the base. Typically, two inwardly extending flanges are separated by an outwardly extending flange which is dimensioned to fit in a slot or recess in the wall of the opening of the container to secure the closure in place. Because of the proximity of the outwardly and inwardly extending flanges to each other and to the ends of the transverse legs or walls of the closure, a force on the inwardly extending flanges first pivots the outwardly extending flanges about any flexing that occurs in the base and then about the integral attachment of the legs to the base, and thus frees the outwardly extending portions from holding engagement with the container opening wall.

The closure base is provided with a grooved or otherwise structurally weakened portion which, unless supported from behind, on flexing deforms to act as a means for indicating that the base has been flexed and thus the closure has been tampered with or removed. The grooved portion in the base, being of sheet steel or the like, when unsupported has insufficient elasticity to return to its original shape upon being flexed to pivotally free the outwardly extending flange portions. The grooved portion is interrupted at a central point along its length thereby to provide means for permitting a T shaped tool for closure positioning to pass therethrough to engage and support the innermost surface of the grooved portion against flexing beyond its limit of elasticity for return to its original shape during insertion of the closure into the container opening. The positioning tool has an overall shape which permits engagement with slots in the inwardly projecting flange portions to hold the outwardly projecting portions inwardly for positioning of the closure in the container opening.

Other features of the closure may include slots in the base for cooling by liquid convection flow and stamped identification indicia in the base for accuracy of record-keeping.

DESCRIPTION OF THE PREFERRED EMBODIMENT

Figure 1:
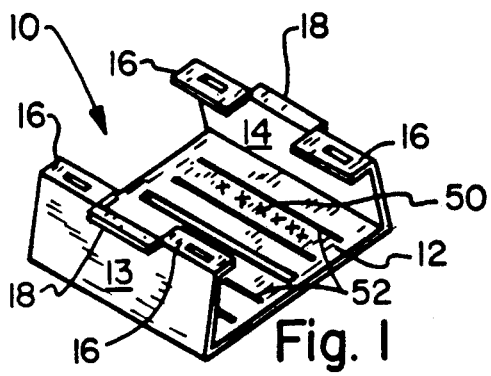
FIG. 1 is a schematic perspective view of a nuclear fuel tamper-proof canister closure constructed according to the principles of the invention.

The numeral 10 generally designates the tamper-proof canister closure of the invention. It includes a square base 12 and transversely extending legs 13 and 14 on opposite sides of the square. At the ends of the legs 13 and 14 are inwardly extending flanges 16 on opposite sides of centrally located outwardly extending flanges or lock tabs 18. Slots 17 are provided in the inwardly extending flanges 16 for engagement with a positioning tool 20 and a removal tool 22.

Figure 2:
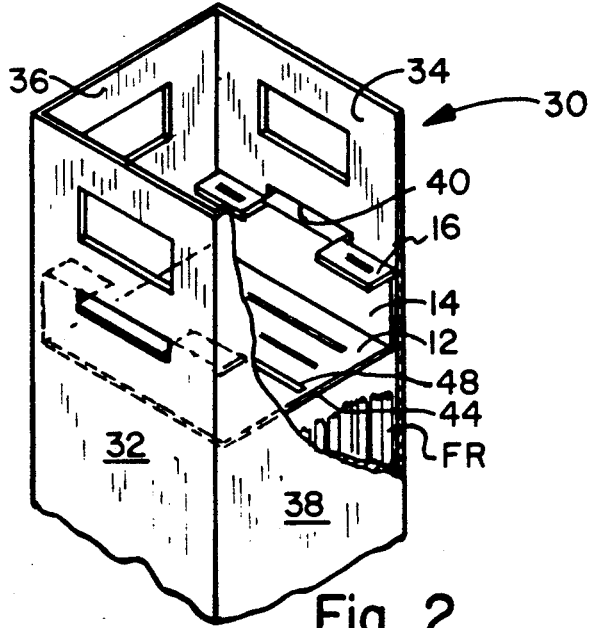
FIG. 2 is a fragmentary schematic perspective view of the closure of FIG. 2 in position in a canister.
Figure 4:
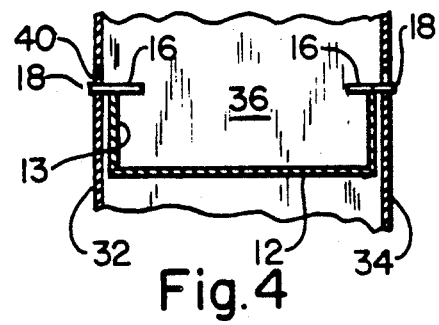
FIG. 4 is a view similar to FIG. 3 with the closure in position for storage and the tool removed.
Figure 7:
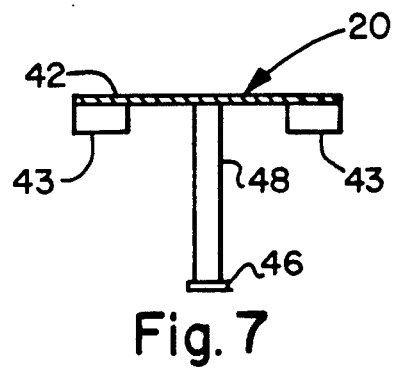
FIG. 7 is a detailed elevational view of the positioning tool illustrated in FIG. 3, taken at 90° from FIG. 3 to show the narrowness of the tool support member for passage through the slot in the base of the closure.
Figure 8:
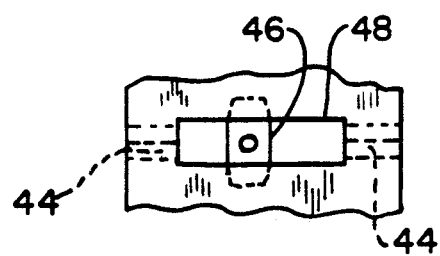
FIG. 8 is a schematic plan cross-sectional view showing the tool in support position behind and below the slot in the base of the closure.

A nuclear fuel consolidation storage canister or container 30 has a square opening defined by pairs of opposite walls 32,34 and 36,38, respectively. The square base 12 is dimensioned so that the closure 10 fits into the container opening. Suitable locking tab receiving slots 40 receive lock tabs 18 when the final storage position shown in FIGS. 2 and 4 is reached with the consolidated fuel rods "FR" in the canister 30.

Figure 3:
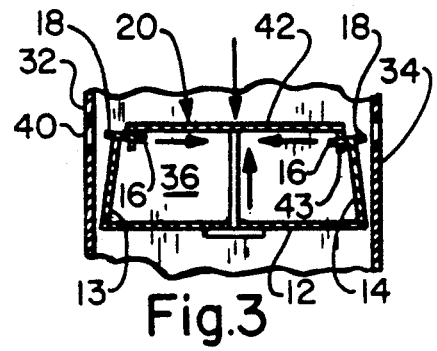
FIG. 3 is a fragmentary schematic elevational cross-sectional view of a positioning tool in use to insert the closure in the canister as shown in FIG. 2.

To position the closure 10, the slotted flanges 16 are engaged by a top spanning member 42 and flanges 43 of positioning tool 20 to hold the tabs 18 inwardly pivoted on legs 13 and 14 of the closure 10. At the same time, to prevent flexing of base 12 to a degree sufficient that a weakened, grooved portion 44 will go beyond its elastic limit and not return, thus falsely indicating tampering or removal, a support member 46 is provided on the lower end of tool 20 which fits through a central slot 48 intermediate the grooved portion 44 in base 12. Support member 46 is rotated 90° for passage through slot 48. Arrows in FIG. 3 indicate the acting forces during positioning as tool 20 is pushed in the opening.

Figure 5:
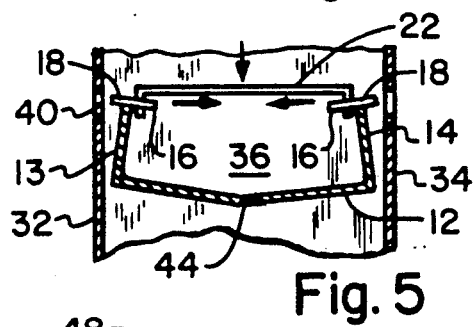
FIG. 5 is a view similar to FIG. 3 with the removal tool in place to remove the closure and the grooved portion of the closure indicating removal or tampering has occurred.
Figure 6:
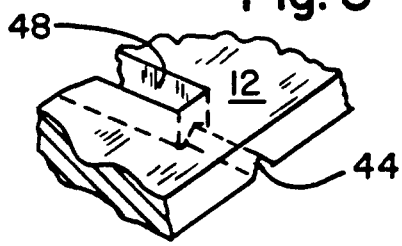
FIG. 6 is a detailed fragmentary perspective view of the grooved indicator portion of the closure before being put in the position of FIG. 5 by removal or tampering.

To remove the closure 10 from position in the container 30, a tool 22 similar to the spanning portion 42 of tool 20, also with transverse flanges 43 for engagement in the slots of flanges 16, is provided. This flexes the base 12 and deforms grooved portion 44 past its elastic limit as it is pulled upwardly to pivot the flanges 18 out of slots 40 and to remove the closure 10 from the opening of container 30. Arrows in FIG. 5 indicate the acting forces during removal as tool 22 is pulled from the opening.

Indicia to preserve the accuracy of identification records are designated by the numeral 50 and are stamped in the base 12 of closure 10. Slots 52 in the base 12 of closure 10 provide convection cooling by flow of water of the spent fuel pool therethrough.

What is claimed is:

1. A tamper-proof closure for receipt in a container opening of a given plane geometric figure having opposite sides comprising:

a closure base, the extremities of which base lie along the perimeter of a similar geometric figure slightly smaller than said plane geometric figure having on opposite sides of said base;

closure walls transversely connected to said base along said opposite sides of the similar geometric figure;

said walls extending outwardly along said opposite sides of said container opening when said closure is in place in said opening with first projecting portions extending inwardly substantially parallel to said base and second projecting portions extending outwardly substantially parallel to said base in engagement with said container such that the application of force on said first inwardly projecting portions of said walls flex the unsupported base and thereby pivotally free the outwardly extending portions from engagement with said container for removal of the closure; and means for indicating that said base has been flexed and therefore indicating whether said closure has been tampered with or removed.

2. The tamper-proof closure of claim 1 in which said means for indicating is a structurally weakened portion of material with insufficient elasticity to return to its original shape upon being flexed to pivotally free said second outwardly projecting portions.

3. The tamper-proof closure of claim 2 in which said material is metal plate and said weakened portion is a grooved portion.

4. The tamper-proof closure of claim 3 in which said grooved portion is interrupted along its length by a central slot.

5. The tamper-proof closure of claim 4 in which said central slot includes means for permitting a tool for closure positioning to pass therethrough to engage and support the innermost surface of said grooved portion against flexing beyond its limit of elasticity for return to its original shape during insertion of said closure into said container opening.

6. The tamper-proof closure of claim 5 in which said first inwardly projecting portions are integral flanges with means for engaging the tool for closure positioning to hold said second outwardly projecting portions inwardly for positioning of the closure in the container opening.

7. The tamper-proof closure of claim 1 in which said first and second projecting portions are integral portions of the closure.

8. The tamper-proof closure of claim 7 in which said closure is made of metal plate and said first and second projecting portions are integral flanges.

9. The tamper-proof closure of claim 8 in which said base and said flanges forming said first inwardly projecting portions are slotted.

10. The tamper-proof closure of claim 1 in which identifying indicia is stamped in said closure structure.

11. The tamper-proof closure of claim 1 in which said second outwardly projecting portions are integral flanges for receipt in openings in said container sidewall.

* * * * *